(12) United States Patent
Xiao et al.

(10) Patent No.: US 11,366,690 B2
(45) Date of Patent: Jun. 21, 2022

(54) SCHEDULING COMMANDS IN A VIRTUAL COMPUTING ENVIRONMENT

(71) Applicant: ALIBABA GROUP HOLDING LIMITED, Grand Cayman (KY)

(72) Inventors: Zhibin Xiao, San Mateo, CA (US); Chunsheng Liu, San Mateo, CA (US); Yuan Xie, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 89 days.

(21) Appl. No.: 16/700,879

(22) Filed: Dec. 2, 2019

(65) Prior Publication Data

US 2021/0165682 A1 Jun. 3, 2021

(51) Int. Cl.
| | | |
|---|---|---|
| G06F 9/48 | (2006.01) | |
| G06F 9/455 | (2018.01) | |
| G06F 13/42 | (2006.01) | |
| G06F 9/52 | (2006.01) | |
| G06F 13/40 | (2006.01) | |

(52) U.S. Cl.
CPC ........ G06F 9/4881 (2013.01); G06F 9/45558 (2013.01); G06F 9/52 (2013.01); G06F 13/4027 (2013.01); G06F 13/4282 (2013.01); G06F 2213/0026 (2013.01)

(58) Field of Classification Search
None
See application file for complete search history.

(56) References Cited

U.S. PATENT DOCUMENTS

| | | | | |
|---|---|---|---|---|
| 5,701,439 A * | 12/1997 | James | ............ | G06F 30/20 703/17 |
| 8,683,469 B2 * | 3/2014 | Molaro | ............ | G06F 11/1435 718/102 |
| 10,133,597 B2 * | 11/2018 | Tian | ............ | G06F 9/4881 |
| 10,198,784 B2 * | 2/2019 | Rasmussen | ............ | G06T 1/20 |
| 10,956,044 B2 * | 3/2021 | Xu | ............ | G06F 3/0613 |
| 2004/0250254 A1 | 12/2004 | Frank et al. | | |
| 2008/0109569 A1 * | 5/2008 | Leonard | ............ | G06F 15/16 710/22 |
| 2008/0109573 A1 * | 5/2008 | Leonard | ............ | G06F 13/28 710/24 |

(Continued)

OTHER PUBLICATIONS

Li et al. "Dynamic Command Scheduling for Real-Time Memory Controllers", 2014 IEEE, pp. 3-14.*

(Continued)

*Primary Examiner* — Van H Nguyen
(74) *Attorney, Agent, or Firm* — Finnegan, Henderson, Farabow, Garrett & Dunner, LLP

(57) ABSTRACT

A method and an apparatus for scheduling commands in a virtual computing environment includes picking a command. It is determined whether the command is a synchronization command or a conditional command. A synchronization command is an independent command. A conditional command is a dependent command that depends on a synchronization command. In response to the command being determined as the synchronization command, a waiting queue is enabled for the command, the waiting queue storing conditional commands dependent on a running synchronization command. The command is dispatched to a processing engine.

21 Claims, 8 Drawing Sheets

(56) References Cited

U.S. PATENT DOCUMENTS

2017/0123849 A1* 5/2017 Tian .................. G06F 9/522
2017/0236246 A1 8/2017 Mrozek
2019/0286479 A1* 9/2019 Tian .................. G06F 9/4881

OTHER PUBLICATIONS

Igel "Command Synchronization", IBM Technical Disclosure 1980, 4 pages.*
International search report and written opinion in related International Application No. PCT/US20/59018, dated Feb. 2, 2021 (14 pgs.).
Asiatici et al., "Virtualized Execution Runtime for FPGA Accelerators in the Cloud," IEEE Access, vol. 5, pp. 1900-1910 (2017).
Augonnet et al., "Data-Aware Task Scheduling on Multi-Accelerator based Platforms," IEEE 16$^{th}$ International Conference on Parallel and Distributed Systems, pp. 291-298 (2010).
Tullsen et al., "Simultaneous Multithreading: Maximizing On-Chip Parallelism," 22$^{nd}$ Annual International Symposium on Computer Architecture, 12 pages (Jun. 1995).

* cited by examiner

Command Format

| OP 401 | FLG 402 | VID 403 |
|--------|---------|---------|

Running Command Status Table

| PE # | PQ_ID | WQ_ID | VID | Latest Sync | CMD Status |
|------|-------|-------|-----|-------------|------------|
| 0    |       |       |     |             |            |
| 1    |       |       |     |             |            |
| 2    |       |       |     |             |            |
| 3    |       |       |     |             |            |

SCHEDULING COMMANDS IN A VIRTUAL COMPUTING ENVIRONMENT

BACKGROUND

Virtualization in computing (e.g., in cloud computing) is technology that can allow users to create multiple simulated environments or dedicated resources from a single, physical hardware system. Existing virtualization technology mainly focuses on general machine virtualization such as virtualization of central processing unit (CPU), I/O and networking resources. Heterogeneous acceleration processing units (HAPUs), such as graphics processing units (GPUs) and field programmable gate array (FPGAs), are emerging technologies that implement custom hardware to significantly speed up computations and increase energy-efficiency. Virtualization of HAPUs involves scheduling tasks on various hardware units in a heterogeneous platform, potentially creating more challenges.

SUMMARY

In some embodiments, an exemplary method of scheduling commands can include: picking a command; determining whether the command is a synchronization command or a conditional command; in response to the command being determined as the synchronization command, enabling a waiting queue for the command; and dispatching the command to a processing engine.

In some embodiments, an exemplary heterogeneous acceleration processing unit (HAPU) can include: one or more physical queues for storing commands; one or more waiting queues for storing commands; one or more processing engines configured to perform commands; a scheduler communicatively coupled with the one or more physical queues, the one or more waiting queues and the one or more processing engines. The scheduler can be configured to: pick a command from a physical queue of the one or more physical queues; determine whether the command is a synchronization command or a conditional command; in response to the command being determined as the synchronization command, enable a waiting queue of the one or more waiting queues for the command; and dispatch the command to a processing engine of the one or more processing engines.

In some embodiments, an exemplary terminal can include: a host unit; and a heterogeneous acceleration processing unit (HAPU) communicatively coupled with the host unit. The HAPU can include: one or more physical queues for storing commands; one or more waiting queues for storing commands; one or more processing engines configured to perform commands; a scheduler communicatively coupled with the one or more physical queues, the one or more waiting queues and the one or more processing engines. The scheduler can be configured to: pick a command from a physical queue of the one or more physical queues; determine whether the command is a synchronization command or a conditional command; in response to the command being determined as the synchronization command, enable a waiting queue of the one or more waiting queues for the command; and dispatch the command to a processing engine of the one or more processing engines.

In some embodiments, a non-transitory computer-readable storage medium can store a set of instructions that is executable by one or more processing devices to cause a heterogeneous computation units (HCUs) to perform a method comprising: picking a command; determining whether the command is a synchronization command or a conditional command; in response to the command being determined as the synchronization command, enabling a waiting queue for the command; and dispatching the command to a processing engine.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the principles and features of the disclosed embodiments. In the drawings:

FIG. 4 is a schematic representation of an exemplary command format, according to some embodiments of the present disclosure.

FIG. 5 is a schematic representation of an exemplary running command status table, according to some embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses, systems and methods consistent with aspects related to the invention as recited in the appended claims.

In virtualization environment, many users can share the same resources. Therefore, virtualization can involve scheduling a plurality of tasks (e.g., commands) from different users on multiple hardware units. Conventional methods and architectures for scheduling tasks have many issues. For example, during scheduling commands, there may be false dependency or head blocking in a command queue, slowing down the scheduling process. Embodiments of the present disclosure can improve upon conventional technologies. For example, some embodiments of the present disclosure can overcome or at least relieve false dependency or head blocking in command scheduling, and thus improve the virtualization performance.

Figure 1:
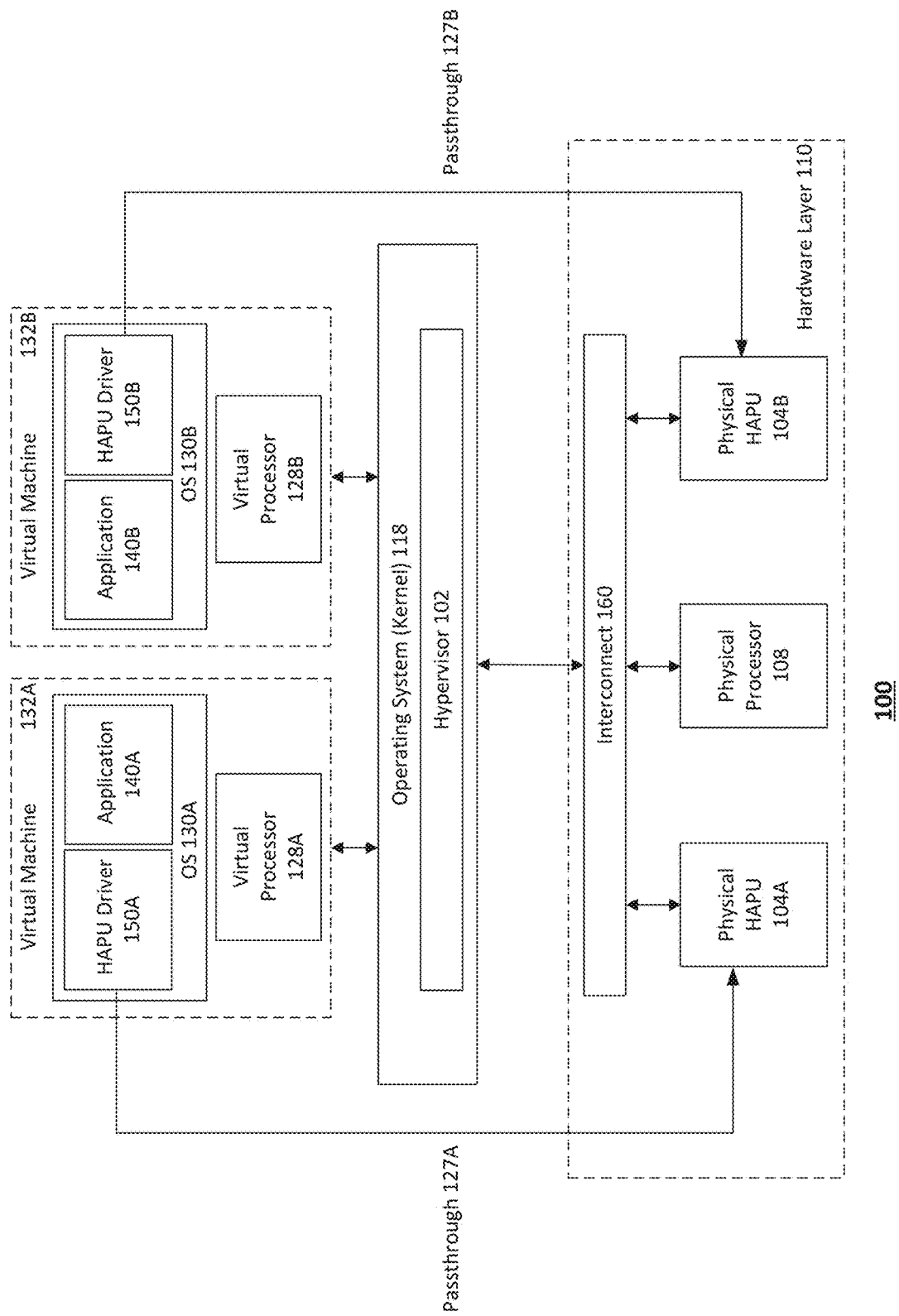
FIG. 1 is a schematic representation of an exemplary virtualization environment, according to some embodiments of the present disclosure.

FIG. 1 is a schematic representation of an exemplary virtualization environment 100, according to some embodiments of the present disclosure. In some embodiments, virtualization environment 100 can be implemented on a server, a client device (or a user), or the like. Modules, programs, virtual machines, or commands can be stored or executed by virtualization environment 100.

As shown in FIG. 1, virtualization environment 100 can include a hardware layer 110 that can include one or more interconnects 160 and one or more physical resources. Physical resources can include one or more physical heterogeneous acceleration processing units (HAPUs) 104 (e.g., physical HAPUs 104A-104B), one or more physical processors 108, and the like. Each physical resource is connected to interconnect 160 on a port of interconnect 160 (e.g., a slot). In some embodiments, operating system (or kernel) 118 or physical processor 108 keeps a mapping between the ports of interconnect 160 and physical resources, including physical HAPUs 104. In some embodiments, physical HAPU 104 can be a graphics processing unit (GPU), a field programmable gate array (FPGA), a neural network processing unit (NPU), a tensor processing unit (TPU), an application-specific integrated circuit (ASIC), or any other processing unit that accelerates computation for a computer application. In some embodiments, physical processor 108 can be a CPU.

In some embodiments, physical resources can include other physical devices, such as one or more memories (not shown). The one or more memories can include any type of memory that can store data, programs, firmware, or executable instructions. Programs, firmware, or executable instructions stored in the one or more memories can be executed by one or more physical processors 108 of virtualization environment 100.

Virtualization environment 100 can further include an operating system (OS) 118 that can be stored in one or more memories and executed by one or more physical processors 108. Operating system 118 can also be referred to as a kernel. Moreover, virtualization environment 100 can include a hypervisor 102. Hypervisor 102 can be a program executed by physical processor(s) 108 in virtualization environment 100 to manage any number of virtual machines, such as virtual machines 132A and 132B. As shown in FIG. 1, hypervisor 102 can run on operating system 118 that provides virtualization services, such as I/O device support and memory management. Alternatively, hypervisor 102 (e.g., "bare metal" embedded hypervisor) can run directly on a hardware resource in hardware layer 110. In some embodiments, operating system 118 can be a Linux kernel, and hypervisor 102 can be a kernel-based virtual machine (KVM).

Operating system 118 and hypervisor 102 can control and manage data flow from and to physical resources in hardware layer 110 through interconnect 160. Each physical resource in hardware layer 110 is connected to interconnect 160 and each physical resource can transmit and receive data to and from each other through their connections to interconnect 160. Data transmission between each physical resource can be managed by operating system 118 or hypervisor 102 by configuring interconnect 160. For example, operating system 118 and hypervisor 102 can configure interconnect 160 to limit data transmission parameter (e.g., data transmission rate, bandwidth, etc.) between physical processor 108 and physical accelerator 104. In some embodiments, interconnect 160 can be a peripheral component interconnect express (PCIe) bus or a mesh network (e.g., NVLink).

Virtual machine 132 (e.g., 132A or 132B) can be a software-based emulation of a physical machine. Virtual machine 132 can further include a software-based emulation of the execution of software programs on such a physical machine. In some embodiments, virtual machine 132 can have a virtual operating system (e.g., virtual operating system (OS) 130A or 130B). Virtual operating system 130 (130A or 130B) can run applications (e.g., application 140A or 140B). Virtual machine 132 can have a virtual processor (e.g., virtual processor 128A or 128B). Virtual machine 132 can have access to the hardware resources in hardware layer 110 through hypervisor 102. For example, through hypervisor 102, virtual machine 132 can have access to one or more physical HAPUs 104, one or more physical processors 108, and one or more memories (not shown). In some embodiments, virtual machine 132 can be accessed by a client device (or a user).

Virtual machine 132 can manage power consumption of physical HAPUs and obtain power consumption information of physical HAPUs through physical HAPUs' driver programs and passthroughs. For example, virtual machines 132A and 132B have HAPU driver programs 150A and 150B installed. HAPU driver programs 150A and 150B can have passthrough functionalities 127A and 127B. Passthrough functionalities 127A and 127B allow virtual machines 132A and 132B to manage power consumption and performance of physical HAPUs 104A and 104B, respectively. For example, as shown in FIG. 2, virtual machine 132A can manage physical HAPU 104A using passthrough 127A of HAPU driver program 150A, and virtual machine 132B can manage physical HAPU 104B using passthrough 127B of HAPU driver program 150B. With passthroughs 127A and 127B, virtual machines 132A and 132B can control the amount of power consumed by physical HAPUs 104A and 104B, cap the power consumption of physical HAPUs 104A and 104B, and monitor the power consumption of physical HAPUs 104A and 104B.

Although virtual machines 132A and 132B can perform power management on physical HAPU 104A and 104B through driver programs and passthrough functionalities, operating system 118 does not have HAPU driver programs installed, and therefore operating system 118 does not have access to power management for physical HAPUs. As shown in FIG. 2, operating system 118 cannot perform power management on physical HAPUs 104A and 104B, since operating system 118 does not have HAPU driver programs (e.g., HAPU driver program 150A-B) installed. As a result, operating system 118 does not have access to information regarding the power consumption of physical HAPUs 104A and 104B. Operating system 118, however, can obtain information on the total power consumption of the data center, which comprises all hardware resources.

Figure 2A:
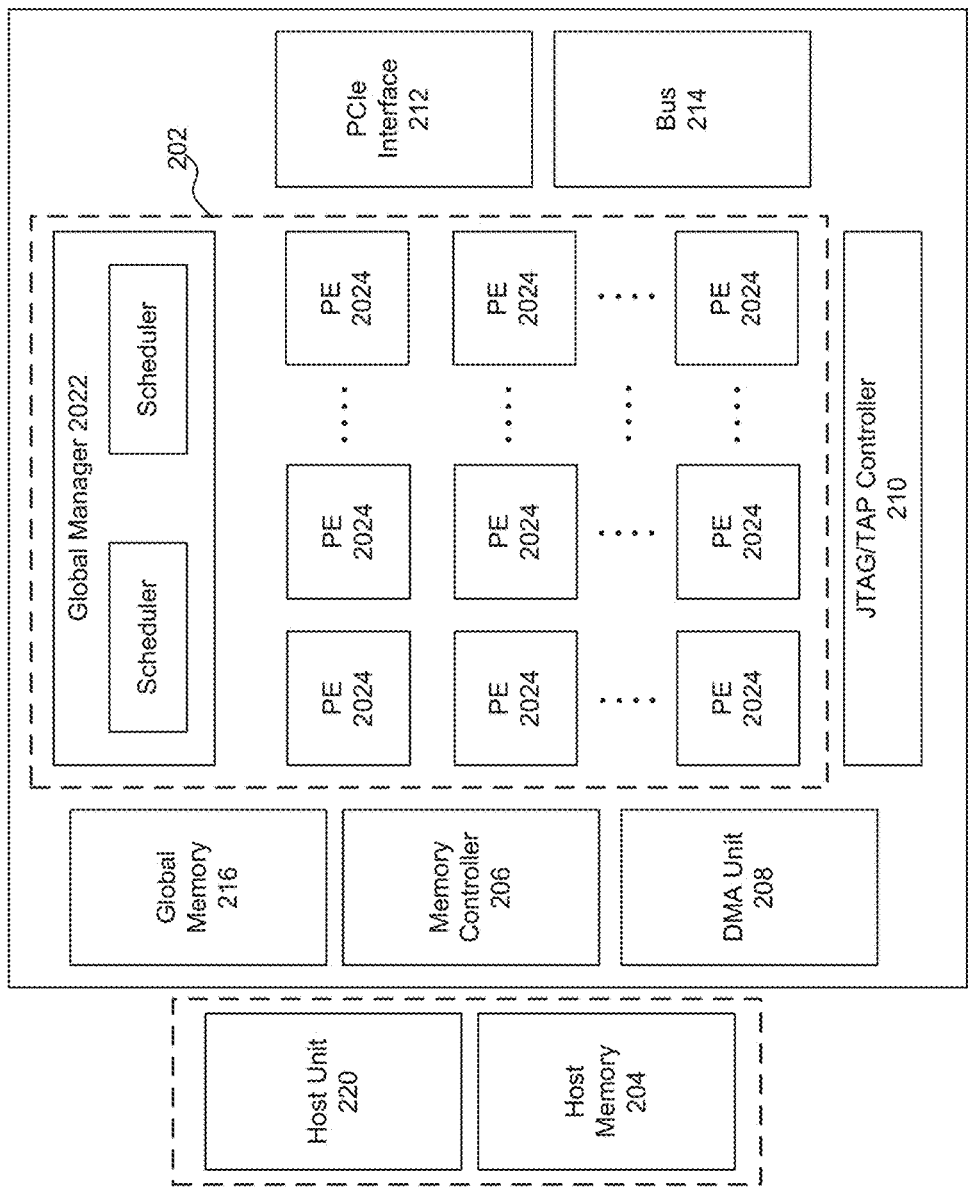
FIG. 2A is a schematic representation of an exemplary neural network processing architecture, according to some embodiments of the present disclosure.

FIG. 2A illustrates an exemplary neural network processing architecture 200, according to some embodiments of the present disclosure. As shown in FIG. 2A, architecture 200 can include a chip communication system 202, a host memory 204, a memory controller 206, a direct memory access (DMA) unit 208, a Joint Test Action Group (JTAG)/Test Access End (TAP) controller 210, a peripheral interface 212, a bus 214, a global memory 216, and the like. It is appreciated that, chip communication system 202 can perform algorithmic operations (e.g., machine learning operations) based on communicated data.

Chip communication system 202 can include a global manager 2022 and a plurality of processing engines (PEs) 2024, which can also be referred to as cores or tiles. Global manager 2022 can include at least one scheduler to coordinate with one or more processing engines 2024 (e.g., scheduling commands or instructions to one or more processing engines. Each scheduler can be associated with an array of processing engines 2024 that provide synapse/neuron circuitry for parallel computation (e.g., the neural network). For example, the top layer of processing elements of FIG. 2A can provide circuitry representing an input layer to a neural network, while the second layer of processing engines may provide circuitry representing a hidden layer of the neural network. In some embodiments, chip communication system 202 can be implemented as a GPU, a FPGA, an NPU, a TPU, an ASIC, or another HAPU. As shown in FIG. 2A, global manager 2022 can include two schedulers to coordinate with two arrays of processing engines.

Processing engines 2024, for example, can include one or more processing elements that each include single instruction, multiple data (SIMD) architecture including one or more processing units configured to perform one or more operations (e.g., multiplication, addition, multiply-accumulate, etc.) based on commands or instructions received from global manager 2022. To perform the operation on the communicated data packets, processing engines 2024 can include one or more processing elements for processing information in the data packets. Each processing element can comprise any number of processing units. In some embodiments, processing engine 2024 can be considered a tile or the like.

Host memory 204 can be off-chip memory such as a host unit's memory. For example, host memory 204 can be a DDR memory (e.g., DDR SDRAM) or the like. Host memory 204 can be configured to store a large amount of data with slower access speed, compared to the on-chip memory integrated within one or more processors, acting as a higher-level cache.

Memory controller 206 can manage the reading and writing of data to and from a specific memory block within global memory 216 having on-chip memory blocks (e.g., 4 blocks of 8 gigabyte (GB) second generation of high bandwidth memory (HBM2)) to serve as main memory. For example, memory controller 206 can manage read/write data coming from outside chip communication system 202 (e.g., from DMA unit 208 or a DMA unit corresponding with another HAPU) or from inside chip communication system 202 (e.g., from a local memory in processing engine 2024 via a two-dimensional mesh controlled by a scheduler of global manager 2022). Moreover, while one memory controller is shown in FIG. 2A, it is appreciated that more than one memory controller can be provided in architecture 200. For example, there can be one memory controller for each memory block (e.g., HBM2) within global memory 216.

Memory controller 206 can generate memory addresses and initiate memory read or write cycles. Memory controller 206 can contain several hardware registers that can be written and read by the one or more processors. The registers can include a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, and/or other typical features of memory controllers.

DMA unit 208 can assist with transferring data between host memory 204 and global memory 216. In addition, DMA unit 208 can assist with transferring data between multiple HAPUs (e.g., HAPU 202). DMA unit 208 can allow off-chip devices to access both on-chip and off-chip memory without causing a CPU interrupt. Thus, DMA unit 208 can also generate memory addresses and initiate memory read or write cycles. DMA unit 208 also can contain several hardware registers that can be written and read by the one or more processors, including a memory address register, a byte-count register, one or more control registers, and other types of registers. These registers can specify some combination of the source, the destination, the direction of the transfer (reading from the input/output (I/O) device or writing to the I/O device), the size of the transfer unit, and/or the number of bytes to transfer in one burst. It is appreciated that architecture 200 can include a second DMA unit, which can be used to transfer data between other neural network processing architectures to allow multiple neural network processing architectures to communication directly without involving the host unit.

JTAG/TAP controller 210 can specify a dedicated debug port implementing a serial communications interface (e.g., a JTAG interface) for low-overhead access to the HAPU without requiring direct external access to the system address and data buses. JTAG/TAP controller 210 can also have on-chip test access interface (e.g., a TAP interface) that implements a protocol to access a set of test registers that present chip logic levels and device capabilities of various parts.

Peripheral interface 212 (such as a peripheral component interconnect express (PCIe) interface), if present, serves as an (and typically the) inter-chip bus, providing communication between architecture 200 and other devices.

Bus 214 includes both intra-chip bus and inter-chip buses. The intra-chip bus connects all internal components to one another as called for by the system architecture. While not all components are connected to every other component, all components do have some connection to other components they need to communicate with. The inter-chip bus connects the HAPU with other devices, such as the off-chip memory or peripherals. Typically, if there is a peripheral interface 212 (e.g., the inter-chip bus), bus 214 is solely concerned with intra-chip buses, though in some implementations it could still be concerned with specialized inter-bus communications.

Chip communication system 202 can be configured to perform operations based on neural networks. For example, chip communication system 202 can be configured to execute neural networks using mechanisms as described herein.

Architecture 200 can also include a host unit 220. Host unit 220 can be one or more processing unit (e.g., an X86 central processing unit). In some embodiments, a host system having host unit 220 and host memory 204 can comprise a compiler (not shown). The compiler is a program or computer software that transforms computer codes written in one programming language into HAPU commands or instructions to create an executable program. In machine learning applications, a compiler can perform a variety of operations, for example, pre-processing, lexical analysis, parsing, semantic analysis, conversion of input programs to an intermediate representation, code optimization, and code generation, or combinations thereof.

In some embodiments, the compiler that generates the HAPU commands can be on the host system, which pushes commands to chip communication system 202. Based on these commands, each scheduler can assign any number of tasks to one or more processing engines (e.g., processing engine 2024). Some of the commands can instruct DMA unit 208 to load the commands (generated by the compiler) and data from host memory 204 into global memory 216. The loaded commands can then be distributed to each processing engine assigned with the corresponding task, and the one or more processing engines can process these commands.

Figure 2B:
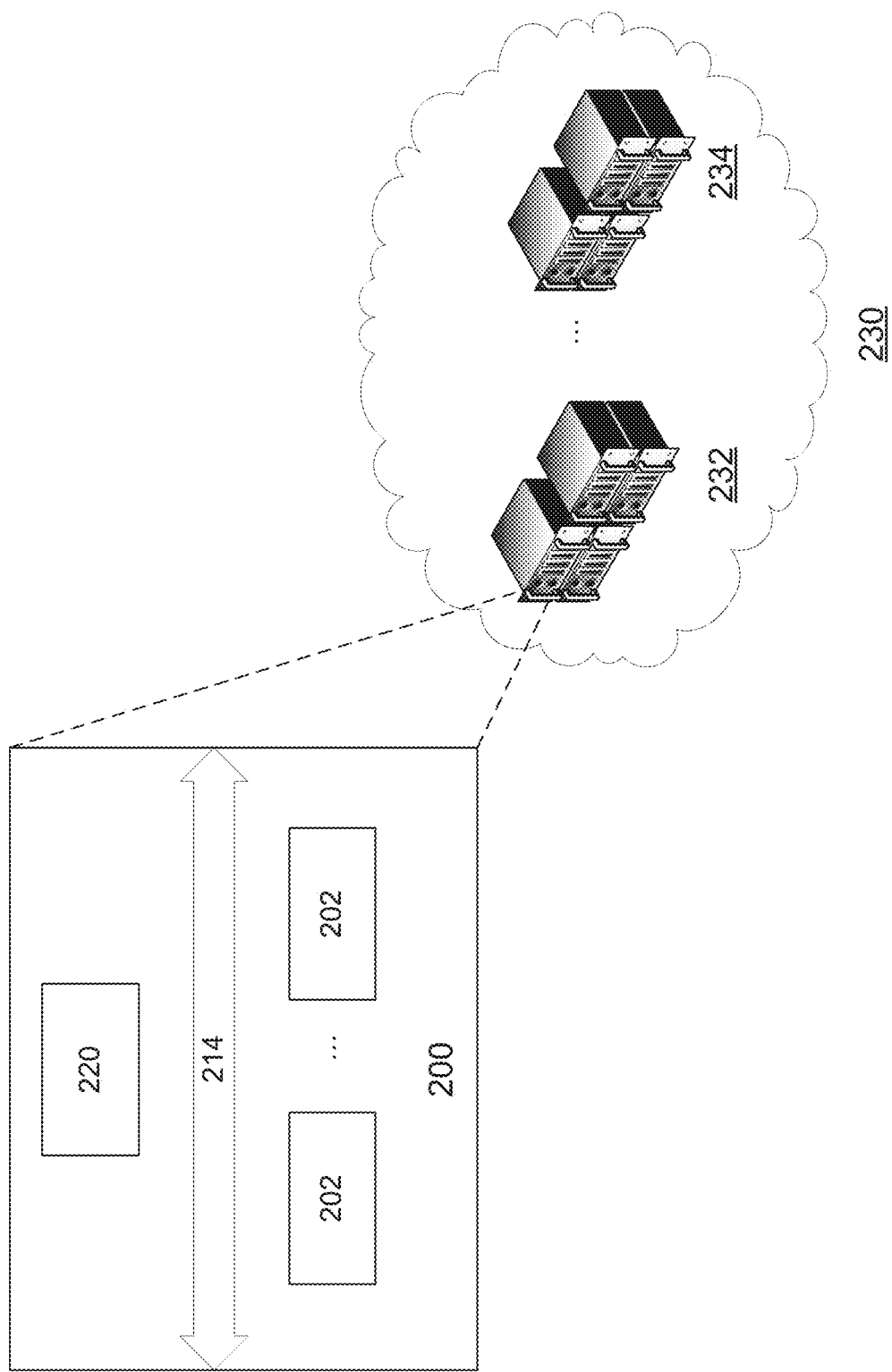
FIG. 2B is a schematic representation of an exemplary cloud system incorporating a neural network processing architecture, according to some embodiments of the present disclosure.

FIG. 2B illustrates a schematic diagram of an exemplary cloud system 230 incorporating neural network processing architecture 200, according to embodiments of the present disclosure.

As shown in FIG. 2B, cloud system 230 can provide cloud service with artificial intelligence (AI) capabilities, and can include a plurality of computing servers (e.g., 232 and 234). In some embodiments, a computing server 232 can, for example, incorporate neural network processing architecture 200 of FIG. 2A. Neural network processing architecture 200 is shown in FIG. 2B in a simplified manner for simplicity and clarity.

Deploying HAPUs for widely-used workloads in the cloud can significantly reduce totally cost of ownership (TCO) for cloud providers. With the assistance of neural network processing architecture 200, cloud system 230 can provide the extended AI capabilities of image recognition, facial recognition, translations, 3D modeling, and the like.

It is appreciated that, neural network processing architecture 200 can be deployed to computing devices in other forms. For example, neural network processing architecture 200 can also be integrated in a computing device, such as a smart phone, a tablet, and a wearable device.

Moreover, while a neural network processing architecture is shown in FIGS. 2A-2B, it is appreciated that any HAPU that provides the ability to perform parallel computation can be used.

It is appreciated that, the embodiments disclosed herein can be used in various application environments, such as artificial intelligence (AI) training and inference, database and big data analytic acceleration, video compression and decompression, and the like. AI-related applications can involve neural network-based machine learning (ML) or deep learning (DL). Therefore, the embodiments of present disclosure can be used in various neural network architectures, such as deep neural networks (DNNs), convolutional neural networks (CNNs), recurrent neural networks (RNNs), or the like, and can be configured for various processing architectures, such as CPUs, GPUs, FPGAs, NPUs, TPUs, ASICs, or the like.

Figure 3:
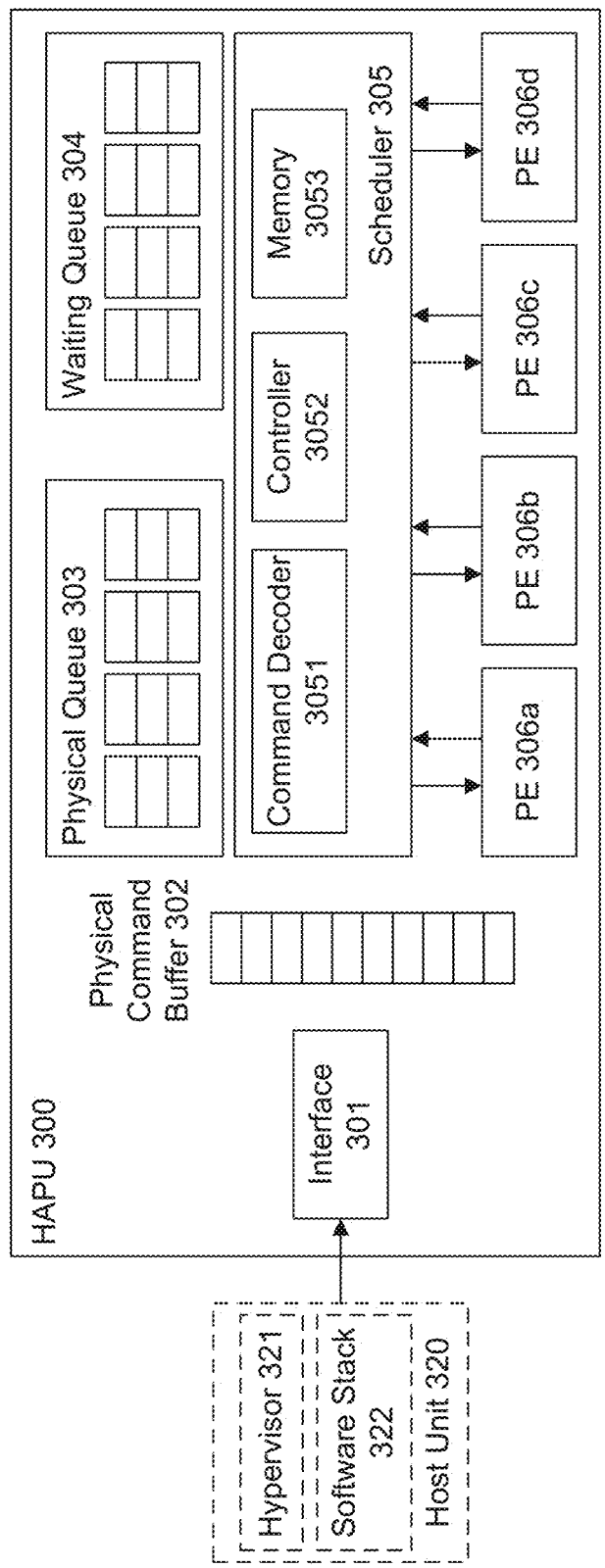
FIG. 3 is a schematic representation of an exemplary heterogeneous acceleration processing unit (HAPU), according to some embodiments of the present disclosure.

FIG. 3 is a schematic representation of an exemplary heterogeneous acceleration processing unit (HAPU) 300, according to some embodiments of the present disclosure. In some embodiments, HAPU 300 can be implemented as physical HAPUs 104A-104B of FIG. 1, HAPU 202 of FIGS. 2A-B. In some embodiments, HAPU 300 can be a GPU, a FPGA, an NPU, a TPU, an ASIC, or any other processing unit that accelerates computation for a computer application. For example, HAPU 300 can be a hardware ASIC HAPU that can accelerate datacenter workload such as machine learning or database query acceleration.

As shown in FIG. 3, HAPU 300 can include an interface 301, a physical command buffer 302, and the like. Interface 301 can be connected to a host unit (e.g., a CPU) 320. A hypervisor 321 or a software stack 322 can be running on host unit 320. In some embodiments, interface 301 can be PCIe (e.g. PCIe interface 212 of FIG. 2A). HAPU 300 can receive data from or output data to hypervisor 321 or software stack 322 on host unit 320 through interface 301. HAPU 300 can also receive or load commands (or instructions) from hypervisor 321 or software stack 322 on host unit 320 through interface 301. A command can include a coarse-grained instruction and can be executed by HAPUs. The commands can be received by the host unit from a plurality of users (e.g., client devices, programmers, or the like) to perform similar or different tasks. For example, the user can operate a software program or application (e.g., application 140A or 140B) on a virtual machine (e.g., virtual machine 132A or 132B) running on the host unit 320. The host unit 320 (e.g., hypervisor 321 or software stack 322) can receive commands from the users and send them to HAPU 300 through interface 301.

It is appreciated that the commands disclosed herein can include different types of commands. For example, the commands can include an independent command that can be independent from previous command (hereinafter referred to as "synchronization command" or shortly "sync command") and a dependent command that can be dependent on previous independent command (hereinafter referred to as "conditional command"). In some embodiments, synchronization command can start a dependency chain containing one or more conditional commands that depend on this synchronization command.

FIG. 4 is a schematic representation illustrating an exemplary command format 400, according to some embodiments of the present disclosure. Command format 400 can be applied to the commands from users and host units (e.g., host unit 220 of FIGS. 2A-2B, or host unit 320 of FIG. 3) to HAPUs (e.g., HAPU 202 of FIGS. 2A-2B, or HAPU 300 of FIG. 3).

As shown in FIG. 4, command format 400 can include a plurality of fields, such as an operation (OP) field 401, a flag (FLG) field 402, a virtual queue identification (VID) field 403, and the like. Operation field 401 can indicate an operation name of the command. Flag field 402 can indicate a type of the command. For example, flag filed can be set to a synchronization flag (S Flag, e.g., 0 or 1) to indicate that the command is a synchronization command that can start a dependency chain, or to a conditional flag (C Flag, e.g., 1 or 0) to indicate that the command is a conditional command that can depend from a previous synchronization command. VID field 403 can indicate an ID for a virtual queue containing the command. In some embodiments, each virtual queue can correspond to a specific user, and VID can be a user-specific ID. For example, in a case where a HAPU (e.g., HAPU 202 of FIGS. 2A-2B, or HAPU 300 of FIG. 3) allows 1024 users to share the HAPU, a 10-bit VID can be attached to each command to the HAPU.

Referring back to FIG. 3, physical command buffer 302 of HAPU 300 can store the commands from host unit 320. A command in physical command buffer 302 can be located through a pointer to an address of the command.

HAPU 300 can also include one or more physical queues (PQs) 303, and one or more waiting queues (WQs) 304. Although four physical queues 303 and four waiting queues 304 are shown in FIG. 3, it is appreciated that HAPU 300 can include more or less physical queues 303 and waiting queues 304. In some embodiments, a number of physical queues 303 can be the same as or different from a number of waiting queues 304.

Physical queue 303 can be an independent unit separated from physical command buffer 302 or a part of physical command buffer 302. In some embodiments, physical queue 303 can store a sequence of one or more commands for execution. Alternatively, physical queue 303 can maintain pointers (e.g., a head and tail link-list like structure) to addresses of one or more commands that are stored in physical command buffer 302.

Waiting queue 304 can store one or more conditional commands that depend on a running synchronization command and wait for the running synchronization command to finish. In some embodiments, waiting queue 304 can be an independent unit separated from physical command buffer 302. In some other embodiments, waiting queue 304 can be incorporated into and be a part of physical command buffer 302. Waiting queue 304 can store a sequence of one or more conditional commands for execution. Alternatively, waiting queue 304 can maintain pointers (e.g., a head and tail link-list like structure) to addresses of one or more conditional commands that are stored in physical command buffer 302. In some embodiments, waiting queue 304 can store conditional commands from the same physical queue 303 and the same user (e.g., having the same VID). In some embodiments, waiting queue 304 can have higher priority to be dispatched over the corresponding physical queue 303. Multiple waiting queues 304 corresponding to the same physical queue 303 can be concurrently active, and can be round-robin picked up to dispatch.

As shown in FIG. 3, HAPU 300 can also include a scheduler 305 (which can be similar to scheduler of FIG. 2A) and one or more processing engines (PEs) 306 (e.g., PE 306a, PE 306b, PE 306c, and PE 306d, which can be similar to PEs 2024 of FIG. 2A). Scheduler 305 can be communicatively coupled with physical queue 303, waiting queue 304, and processing engines 306. Scheduler 305 can schedule commands from physical queue 303 and waiting queue 304 and dispatch them to one or more processing engines 306. For example, scheduler 305 can pick a command (e.g., a command address) from physical queue 303 or waiting queue 304, and determine whether the command is a synchronization command or a conditional command (e.g., via flag field of the command). If the command is determined as synchronization command, scheduler 305 can enable a waiting queue for the command and dispatch the command to a processing engine 306. If the command is determined as conditional command, scheduler 305 can determine whether there is a running synchronization command having the same VID as the command and marked as the latest. If so, scheduler 305 can push the conditional command to a waiting queue corresponding to the synchronization command. If not, scheduler 305 can dispatch the conditional command to a processing engine. In some embodiments, scheduler 305 can track a status of a dispatched running command.

In some embodiments, scheduler 305 can include a command decoder 3051, a controller 3052 and a memory 3053. Command decoder 3051 can decode the command from physical queue 303 and waiting queue 304. Controller 3052 can control a scheduling process of the command. Memory 3053 can provide storage for command, data and other information of the scheduler 305. For example, memory 3053 can contain one or more hardware registers that can be written and read by the controller 3052. In some embodiments, memory 3053 can include a running command status table to track statuses of dispatched commands.

FIG. 5 is a schematic representation of an exemplary running command status table 500, according to some embodiments of the present disclosure. Running command status table 500 can be implemented in a scheduler (e.g., scheduler of FIG. 2A, or scheduler 305 of FIG. 3) of a HAPU (e.g., HAPU 202 of FIGS. 2A-2B, or HAPU 300 of FIG. 3).

Running command status table 500 can be utilized to track statuses of commands that are dispatched to the processing engines. As shown in FIG. 5, running command status table 500 can include a plurality of entries, such as entries 0-3. In some embodiments, running command status table 500 can contain an entry for each of the processing engines on the HAPU (e.g., PEs 306a-d on HAPU 300 of FIG. 3). A number of entries in running command status table 500 can be equal to a number of processing engines of the HAPU.

As shown in FIG. 5, each entry (e.g., entry 0, entry 1, entry 2 or entry 3) of running command status table 500 can include multiple fields, such as physical queue ID (PQ_ID) field, waiting queue ID (WQ_ID) field, VID field, and the like. Physical queue ID field can indicate the physical queue that the command dispatched to a particular processing engine is originally from. If the command is from a waiting queue, waiting queue ID field can indicate the waiting queue that the command is from. VID field can record a virtual queue ID of the command.

In some embodiments, each entry (e.g., entry 0, entry 1, entry 2 or entry 3) of running command status table 500 can include a latest synchronization (or latest sync) field to indicate whether a synchronization command is the latest. For example, in a case that there are multiple synchronization commands from the same user (e.g., having the same VID), latest synchronization field can mark the latest synchronization command.

In some embodiments, each entry (e.g., entry 0, entry 1, entry 2 or entry 3) of running command status table 500 can also include a command (CMD) status field to indicate whether the command succeeds or fails.

It is appreciated that running command status table 500 can include more or less fields than those shown in FIG. 5.

Referring back to FIG. 3, memory 3053 can also store other data or information. In some embodiments, memory 3053 can include a physical queue table to track a physical queue ID (PQ_ID) for a waiting queue that contains one or more commands from the physical queue. In some embodiments, memory 3053 can include a synchronization command table to, for a waiting queue, track a synchronization command that commands in the waiting queue depend from, or track which processing engine is running the synchronization command that commands in the waiting queue depend from. In some embodiments, memory 3053 can include a virtual queue command status table to track execution of a virtual queue. If there is an error in the virtual queue command status table for the virtual queue, the execution of the virtual queue fails. For example, the virtual queue command status table can, for a virtual queue, track whether a synchronization command in the virtual queue succeeds or not. The virtual queue command status table can retain status information even after the synchronization command retires from the running command status table. Alternatively, the virtual queue command status table can track whether the latest synchronization command in a virtual queue succeeds or not. For example, the virtual queue command status table can contain a one-bit field for a virtual queue to track a status of its latest synchronization command. A number of entries of the virtual queue command status table can be equal to a number of virtual queues or a number of users sharing the HAPU 300.

Scheduler 305 (e.g., controller 3052) can update one or more tables in memory 3053 (e.g., running command status table, physical queue table, synchronization command table, and virtual queue command status table). In some embodiments, processing engine 306 can update or maintain the running command status table (e.g., physical queue ID field, waiting queue ID field, VID field, or CMD status field) or virtual queue command status table. In some embodiments, waiting queue 304 can update or maintain the physical queue table, synchronization command table, or virtual queue command status table.

Processing engine 306 (e.g., PE 306a, PE 306b, PE 306c, or PE 306d) can include one or more processing elements that are configured to perform one or more operations (e.g., multiplication, addition, multiply-accumulate, etc.) based on commands received from scheduler 305. To perform the operation on the communicated data packets, processing engines 306 can include one or more processing elements for processing information in the data packets. Each processing element can comprise any number of processing units. Although four processing engines are shown in FIG. 3, it is appreciated that HAPU 300 can include more or less processing engines. In some embodiments, a number of processing engines 306 can be equal to that of physical queues 303 or that of waiting queue 304. Each physical queue 303 or each waiting queue 304 can correspond to one processing engine 306.

Figure 6:
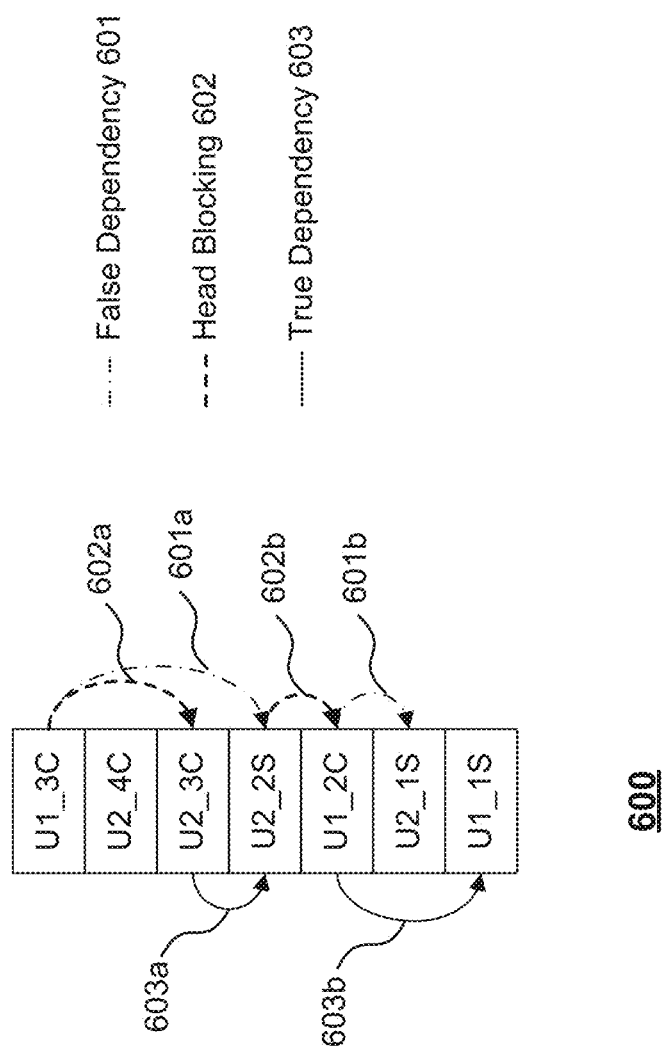
FIG. 6 is a schematic representation of an exemplary command queue, according to some embodiments of the present disclosure.

FIG. 6 is a schematic representation of an exemplary command queue 600, according to some embodiments of the present disclosure. command queue 600 can be implemented as physical queue 303 on HAPU 300 of FIG. 3.

If commands in command queue 600 are scheduled in existing method, there may be false dependency and head blocking between commands from different users. As shown in FIG. 6, for example, command queue 600 includes a sequence of commands that are from two users, user 1 and user 2, in following orders:

User 1: U1_1S, U1_2C, U1_3C
User 2: U2_1S, U2_2S, U2_3C, U2_4C where U1 and U2 represent user 1 and user 2, respectively, S represents synchronization command, C represents conditional command, and the number before S or C represents sequence number of the command.

In command queue 600, however, the commands are in a specific sequence: from top to bottom, U1_3C, U2_4C, U2_3C, U2_2S, U1_2C, U2_1S, U1_1S. If command queue 600 is scheduled and performed in this order, from bottom to top, there are two false dependencies 601 between U1_3C and U2_2S (as indicated by arrow 601a), U1_2C and U2_1S (as indicated by arrow 601b). Additionally, another issue is the head blocking 602. For example, U2_3C is in the head of command queue 600 and waits for U2_2S to finish. It will block U1_3C from dispatching even U1_3C has no dependency on U2_2S and there is a processing engine available for use, as indicated by arrow 602a. Similar situation can happen between U2_2S and U1_2C, as indicated by arrow 602b.

In some embodiments of the present disclosure, a command can include a virtual queue ID (VID) field to differentiate distinct users and form a command chain or sequence (e.g., a virtual queue) for a particular user. The scheduler (e.g., scheduler 305 of FIG. 3) can maintain dependency chain within the same virtual queue and schedule commands according to the dependency chain. For example, U1_3C does not have to wait for U2_2S to finish, and false dependency therebetween can be overcome.

In some embodiments of the present disclosure, a waiting queue can be included to allow out-of-order dispatch. Conditional commands that wait for a synchronization command can be popped from physical queue and pushed into the waiting queue. Therefore, the head blocking can be removed.

Figure 7:
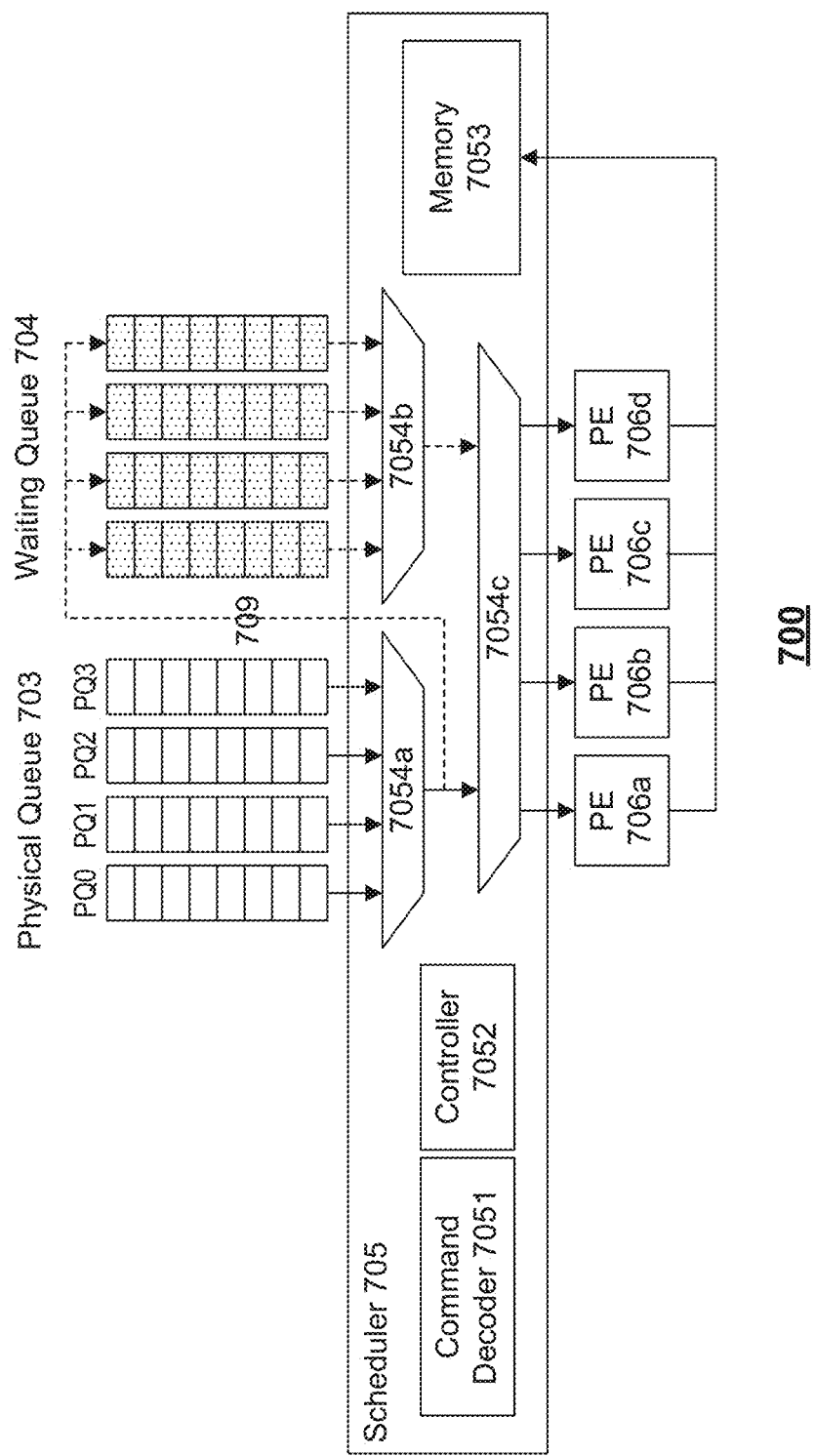
FIG. 7 is a schematic representation of an exemplary command scheduling mechanism, according to some embodiments of the present disclosure.

FIG. 7 is a schematic representation of an exemplary command scheduling mechanism 700, according to some embodiments of the present disclosure. In some embodiments, command scheduling mechanism 700 can be implemented by physical HAPUs 104A-B of FIG. 1, HAPU 202 of FIGS. 2A-B, or HAPU 300 of FIG. 3.

As shown in FIG. 7, command scheduling mechanism 700 can include physical queue 703 (e.g, PQ0, PQ1, PQ2, or PQ3), waiting queue 704, scheduler 705, and one or more processing engines 706 (e.g., PE 706a, PE 706b, PE 706c, and PE 706d). Similar description to that for physical queue 303, waiting queue 304, scheduler 305, and processing engine 306 can also be applied to physical queue 703, waiting queue 704, scheduler 705, and processing engine 706, respectively.

Scheduler 705 can include a command decoder 7051, a controller 7052 and a memory 7053. Additionally, scheduler 705 can also include a plurality of multiplexers, such as multiplexer 7054a communicatively coupled with physical queues 703, multiplexer 7054b communicatively coupled with waiting queue 704, and multiplexer 7054c communicatively coupled with outputs of multiplexer 7054a and multiplexer 7054b and with processing engines 706 (e.g., PE 706a, PE 706b, PE 706c, and PE 706d).

In operation, physical queue 703 can contain one or more commands for execution. Scheduler 705 can pick a command from physical queue 703 and determine whether the command is a synchronization command or a conditional command. For example, controller 7052 can control multiplexer 7054a to select a command from one of PQs 0-3. Then, command decoder 7051 can decode the command, and controller 7052 can read a flag field of the command to determine whether the command is a synchronization command or a conditional command.

If the current command is determined as synchronization command, scheduler 705 can enable a waiting queue for the command and dispatch the command to a processing engine 706. For example, if the command is determined as synchronization command, controller 7052 can determine whether there is any waiting queue 704 available. Controller 7052 can check a physical queue table in memory 7053 to find any available waiting queue 704 that does not have a corresponding physical queue. If there is an available waiting queue, controller 7052 can enable the available waiting queue for the current command, and dispatch the current command to processing engine 706 (e.g., PE 706a, PE 706b, PE 706c, or PE 706d) through multiplexer 7054c. Additionally, controller 7052 can also set a physical ID field for the enabled waiting queue in physical queue table to the physical queue ID of the current command. If there is no waiting queue available, controller 7052 can wait. In some embodiments, controller 7052 can update a synchronization command table to reflect that the enabled waiting queue is corresponding to the current command.

In some embodiments, scheduler 705 can also update a running command status table. For example, controller 7052 can update physical queue ID field and VID field of an entry corresponding to the processing engine 706 in the running command status table in memory 7053 to the physical queue ID and VID of the current command, respectively.

In some embodiments, scheduler 705 can also compare a VID of the current command with the running command status table, and determine whether there is another synchronization command from the same user. If there is another synchronization command from the same user, scheduler 705 can clear latest synchronization field for this synchronization command in the running command status table and mark current synchronization command as the latest synchronization command. If not, scheduler 705 can mark current synchronization command as the latest synchronization command. For example, controller 7052 can read VID field of the command, and compare the VID of the command with the running command status table. If there is another synchronization command having the same VID, controller 7052 can clear latest synchronization field for this synchronization command in the running command status table and set latest synchronization field for current synchronization command. If not, controller 7052 can set latest synchronization field for current synchronization command in the running command status table.

If the current command is determined as a conditional command, scheduler 705 can determine whether there is a running synchronization command having the same VID as the current command and marked as the latest. If so, scheduler 705 can push the conditional command to a waiting queue corresponding to the synchronization command. If not, scheduler 705 can dispatch the conditional command to a processing engine. For example, if the flag field of current command indicates that current command is a conditional command, controller 7052 can compare VID of current command with the running command status table to find any running synchronization command having the same VID as the current command and marked as latest (e.g., with latest synchronization field being set). If a running synchronization command is found, controller 7052 can push the conditional command to the waiting queue for the synchronization command, as indicated by line 709. If not, controller 7052 can dispatch the conditional command to a processing engine 706 (e.g., PE 706a, PE 706b, PE 706c, or PE 706d) through multiplexer 7054c.

In some embodiments, scheduler 705 can determine whether there is an error in execution of the virtual queue that contains current command. If there is an error, scheduler 705 can dispatch the current command as a no-operation (no-op) operation and mark the current command as failure. If there is no error, scheduler 705 can update the running command status table and dispatch the current command to a processing engine 706 (e.g., PE 706a, PE 706b, PE 706c, or PE 706d). For example, controller 7052 can check a virtual queue command status table to find whether there is an error in status field (e.g., one-bit field) for the virtual queue containing current command (e.g., having the same VID). If there is an error, controller 7052 can dispatch the current command as a no-op operation and set the CMD status field for the current command in running command status table as failure. If there is no error, controller 7052 can update the running command status table with information of the current command, and dispatch the current command to a processing engine 706 (e.g., PE 706a, PE 706b, PE 706c, or PE 706d) through multiplexer 7054c.

In some embodiment, if a synchronization command is successfully performed, and it has a corresponding waiting queue 704, scheduler 705 can pick a command from the corresponding waiting queue 704, update the running command status table, and dispatch the command to a processing engine 706. For example, if a synchronization command is successfully performed on a processing engine 706, controller 7052 or this processing engine 706 can update CMD field for the synchronization command accordingly. Controller 7052 can check a synchronization command table in memory 7053 to find any waiting queue 704 corresponding to the synchronization command. If there is a corresponding waiting queue 704, controller 7052 can pick a command from the corresponding waiting queue 704 through multiplexer 7054b, update the running command status table with information of the command, and dispatch the command to a processing engine 706 (e.g., PE 706a, PE 706b, PE 706c, or PE 706d) through multiplexer 7054c.

Figure 8:
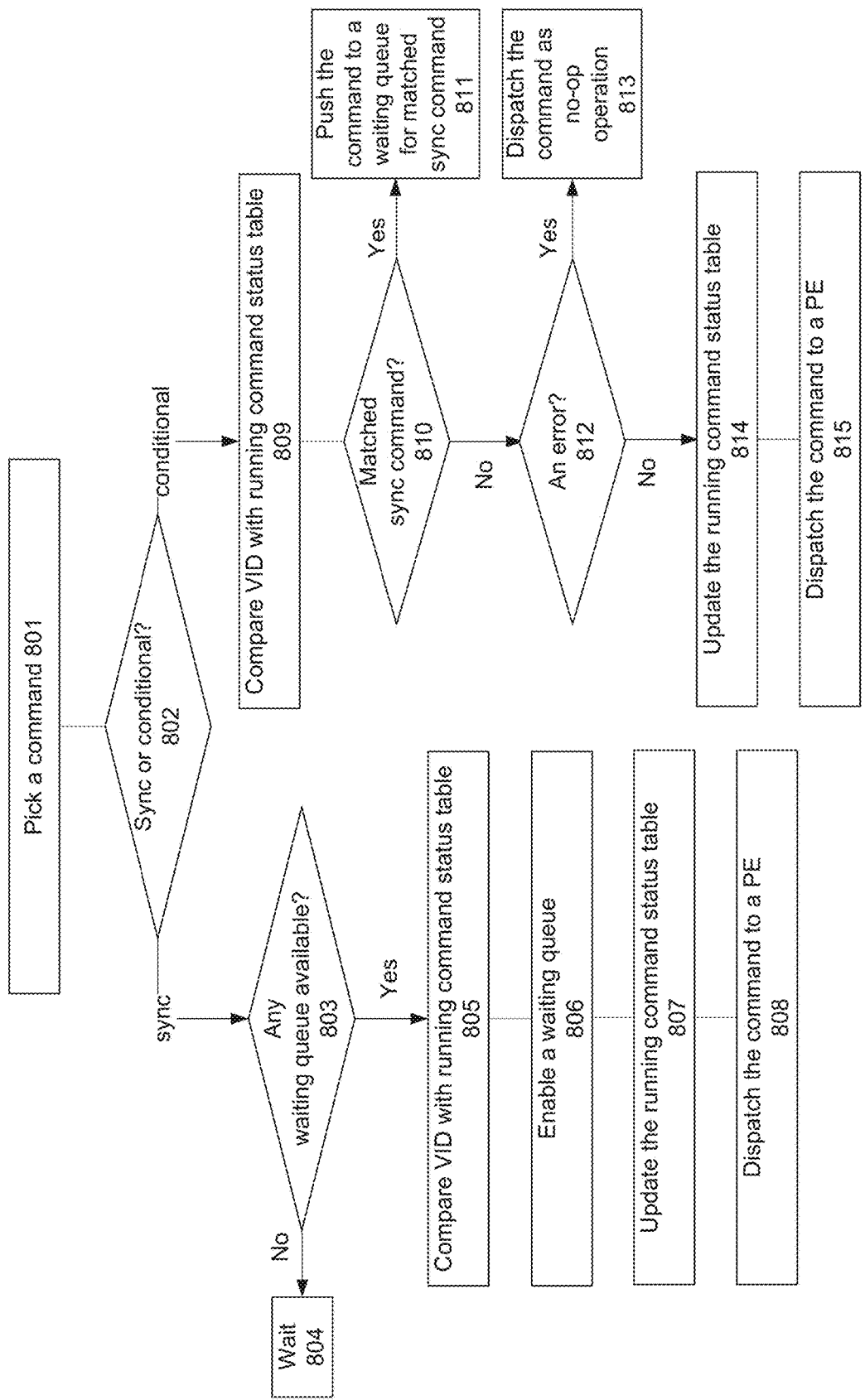
FIG. 8 is a flowchart of an exemplary method for scheduling commands, according to some embodiments of the present disclosure.

FIG. 8 is a flowchart of an exemplary method 800 for scheduling commands, according to some embodiments of the present disclosure. In some embodiments, method 800 can be implemented by physical HAPUs 104A-104B of FIG. 1, HAPU 202 of FIGS. 2A-B, HAPU 300 of FIG. 3, or architecture of FIG. 7. In some embodiments, method 800 can be implemented by a computer program product, embodied in a computer-readable medium, including computer-executable instructions, such as program code, executed by computers.

As shown in FIG. 8, at step 801, a command can be picked. For example, a scheduler (e.g., a scheduler of FIG. 2A, scheduler 305 of FIG. 3 or scheduler 705 of FIG. 7) can pick a command from a physical queue (e.g., physical queue 303 of FIG. 3 or physical queue 703 of FIG. 7). In some embodiments, a controller (e.g., controller 3052 of FIG. 3 or controller 7052 of FIG. 7) of the scheduler can control a multiplexer (e.g., multiplexer 7054a of FIG. 7) to select a command from one of a plurality of physical queues.

At step 802, whether the command is a synchronization command or a conditional command can be determined. For example, the scheduler can read a flag field of the command and determine that the command is a synchronization command or a conditional command. In some embodiments, a decoder (e.g., command decoder 3051 of FIG. 3 or command decoder 7051 of FIG. 7) of the scheduler can decode the command, and the controller of the scheduler can read flag field of the command and determine, based on the flag field, whether the command is a synchronization command or a conditional command.

If the command is determined as synchronization command ("sync" branch), method 800 proceeds to step 803 to determine whether there is any waiting queue available. For example, the scheduler can determine whether there is a waiting queue available for the command. In some embodiments, the controller of the scheduler can check a physical queue table (e.g., in memory 3053 of FIG. 3 or memory 7053 of FIG. 7) to find any available waiting queue that does not have a corresponding physical queue.

If there is no waiting queue available ("No" branch), method 800 proceeds to step 804 where method 800 can wait for an available waiting queue. For example, if the scheduler determines that there is no waiting queue available, it can wait for an available waiting queue. In some embodiment, the scheduler can pick another command to process and go back to the waiting command later.

If there is a waiting queue available ("Yes" branch), method 800 proceeds to step 805 where VID of the command can be compared with a running command status table. As discussed above with reference to FIG. 5, the running command status table can include a plurality of entries. Each entry can contain multiple fields, such as physical queue ID (PQ_ID) field, waiting queue ID (WQ_ID) field, VID field, latest synchronization field, CMD status field, and the like. In some embodiments, the scheduler can compare information of the command with one or more fields in the running command status table. For example, the scheduler (e.g., the controller of the scheduler) can read VID field of the command, and compare the VID of the command with the running command status table to determine whether there is another synchronization command from the same user. If there is another synchronization command having the same VID, the scheduler can clear latest synchronization field for this synchronization command in the running command status table and set latest synchronization field for the current command to mark the current command as the latest. If there is not another synchronization command having the same VID, scheduler can set latest synchronization field for the current command in the running command status table.

At step 806, a waiting queue is enabled. The enabled waiting queue can correspond to the current command. For example, the scheduler can assign an available waiting queue to the current command. In some embodiments, the scheduler can set a physical ID field for the enabled waiting queue in physical queue table (e.g., in memory 3053 of FIG. 3 or memory 7053 of FIG. 7) to the physical queue ID of the current command. In some embodiments, the scheduler can update a synchronization command table (e.g., in memory 3053 of FIG. 3 or memory 7053 of FIG. 7) to reflect that the enabled waiting queue is corresponding to the current command.

At step 807, the running command status table can be updated. For example, the scheduler can update physical queue ID field and VID field of an entry corresponding to the current command in the running command status table (e.g., in memory 3053 of FIG. 3 or memory 7053 of FIG. 7) to the physical queue ID and VID of the current command, respectively.

At step 808, the command can be dispatched to a processing engine. For example, the scheduler can dispatch the current command to a processing engine (e.g., PE 306a, PE 306b, PE 306c, or PE 306d of FIG. 3, or PE 706a, PE 706b, PE 706c, or PE 706d of FIG. 7).

If, at step 802, the current command is determined as a conditional command ("conditional" branch), method 800 proceeds to step 809 where the VID of the current command can be compared with the running command status table. In some embodiments, the scheduler can compare information in VID field of the command with VID fields in the running command status table.

At step 810, whether there is a matched synchronization command in the running command status table can be determined. The matched synchronization command can be from the same user as the current command and can be marked as the latest. For example, the scheduler (e.g., the controller of the scheduler) can read VID field of the current command, and compare the VID with the running command status table to determine whether there is a matched synchronization command having the same VID and marked as latest (e.g., with latest synchronization field being set).

If there is a matched synchronization command ("Yes" branch), at step 811, the current command can be pushed to a waiting queue corresponding to the matched synchronization command. For example, the scheduler can push the conditional command to a waiting queue corresponding to the matched synchronization command having the same VID and marked as the latest.

If there is no matched synchronization command ("No" branch), at step 812, whether there is an error in execution of a virtual queue that contains current command can be determined. For example, the scheduler (e.g., the controller of the scheduler) can check a virtual queue command status table to find whether there is an error in status field (e.g., one-bit field) for the virtual queue containing current command (e.g., having the same VID).

If there is an error ("Yes" branch), at step 813, the current command can be dispatched as a no-op operation. For example, the scheduler (e.g., the controller of the scheduler) can dispatch the current command as a no-op operation and mark the current command as failure.

If there is no error ("No" branch), at step 814, the running command status table can be updated. For example, the scheduler (e.g., the controller of the scheduler) can update the running command status table with information of the current command (e.g., physical queue ID, VID, or the like).

At step 815, the current command can be dispatched to a processing engine. For example, the scheduler (e.g., the controller of the scheduler) can dispatch the current command to a processing engine (e.g., PE 306a, PE 306b, PE 306c, or PE 306d of FIG. 3, or PE 706a, PE 706b, PE 706c, or PE 706d of FIG. 7).

In some embodiment, method 800 can include if a synchronization command having a corresponding waiting queue is successfully performed, picking a command from the corresponding waiting queue, updating the running command status table, and dispatching the command to a processing engine. For example, after a synchronization command is successfully performed on a processing engine, the scheduler (e.g., the controller of the scheduler) or this processing engine can update CMD field for the synchronization command accordingly. The scheduler can check the synchronization command table to find any waiting queue corresponding to the synchronization command. If there is a corresponding waiting queue, the scheduler can pick a command from the corresponding waiting queue, update the running command status table with information of the picked command, and dispatch the command to a processing engine.

In some embodiments, the waiting queue can have higher priority to be dispatched over the corresponding physical queue. Multiple waiting queues corresponding to the same physical queue can be concurrently active, and can be round-robin picked up to dispatch.

Embodiments of the present disclosure can bring many technical advantages. For example, in some embodiments, the HAPU can provides a command scheduling mechanism to allow multiple users to share the HAPU at a fine granularity level. The virtualization of the HAPU can be improved. In some embodiments, the supported number of users can be very large while quality of service (QoS) for each user can still be guaranteed.

Some embodiments of the present disclosure can utilize a virtual queue-based concept and schedule coarse-grained command instead of fine-grained instructions to improve performance of the virtualization.

Some embodiments of the present disclosure can solve or at least relieve multi-tenant problem that is one of the main challenges for virtualization. For example, in some embodiments, VID can be attached to each command to remove false dependency between commands from different users when the commands are scheduled to processing engines. In some embodiment, a waiting queue can be introduced to allow out-of-order command dispatch to overcome head blocking problem. In some embodiments, the status of running commands and the information of waiting queues can be tracked during the scheduling, and dependency chain of the commands can be maintained.

Embodiments of the present disclosure can be applied to many products, environments, and scenarios. For example, some embodiments of the present disclosure can be applied to Ali-NPU (e.g., Hanguang NPU), Ali-Cloud, Ali PIM-AI (Processor-in Memory for AI), Ali-DPU (Database Acceleration Unit), Ali-AI platform, GPU, TPU, or the like.

The embodiments may further be described using the following clauses:

1. A method of scheduling commands, comprising:
   picking a command;
   determining whether the command is a synchronization command or a conditional command;
   in response to the command being determined as the synchronization command, enabling a waiting queue for the command; and
   dispatching the command to a processing engine.

2. The method of clause 1, wherein enabling a waiting queue for the command comprises:
   determining whether there is a waiting queue available; and
   in response to there being a waiting queue available, enabling the waiting queue for the command.

3. The method of clause 2, further comprising:
   in response to there being a waiting queue available, comparing a virtual queue ID (VID) of the command with a running command status table, the running command status table comprising a VID for each dispatched command.

4. The method of clause 3, further comprising:
   in response to there being a waiting queue available, determining whether there is another synchronization command in the running command status table having the same VID as the command; and
   in response to there being another synchronization command in the running command status table having the same VID, clearing the latest synchronization field for the another synchronization command in the running command status table.

5. The method of any of clauses 1-4, wherein enabling a waiting queue for the command comprises:
   updating a synchronization command table to reflect that the enabled waiting queue is corresponding to the command.

6. The method of any of clauses 1-5, further comprising:
   in response to the command being determined as the synchronization command, updating a running command status table.

7. The method of any of clauses 1-6, further comprising:
   setting a latest synchronization field for the command in the running command status table.

8. The method of any of clauses 1-7, further comprising:
   in response to the command being determined as the conditional command, comparing a VID of the command with a running command status table, the running command status table comprising a VID for each dispatched command.

9. The method of clause 8, further comprising:
   in response to the command being determined as the conditional command,
     determining whether there is a matched synchronization command in the running command status table having the same VID and having a latest synchronization field being set; and
     in response to there being the matched synchronization command in the running command status table, pushing the conditional command to a waiting queue corresponding to the matched synchronization command.

10. The method of clause 8, further comprising:
    in response to the command being determined as the conditional command,
      determining whether there is a matched synchronization command in the running command status table having the same VID and having a latest synchronization field being set; and
      in response to there being no matched synchronization command in the running command status table,
        determining whether a status field in a virtual queue command status table indicates an error; and
        in response to the status field being determined not indicating an error, dispatching the command to a processing engine.

11. The method of clause 10, further comprising:
    in response to the status field being determined indicating an error, dispatching the command as no-op operation.

12. The method of clause 10, further comprising:
    in response to there being no matched synchronization command in the running command status table, updating a running command status table.

13. The method of any of clauses 1-12, wherein enabling the waiting queue for the command comprises:
    setting a physical queue ID for the waiting queue to a physical queue ID of a physical queue from which the command is picked.

14. The method of any of clauses 1-13, further comprising:
    in response to a synchronization command having a corresponding waiting queue is successfully performed,
      picking a second command from the corresponding waiting queue;
      updating a running command status table; and
      dispatching the second command to a processing engine.

15. A heterogeneous acceleration processing unit (HAPU), comprising:
    one or more physical queues for storing commands;
    one or more waiting queues for storing commands;
    one or more processing engines configured to perform commands;
    a scheduler communicatively coupled with the one or more physical queues, the one or more waiting queues and the one or more processing engines, the scheduler being configured to:
      pick a command from a physical queue of the one or more physical queues;
      determine whether the command is a synchronization command or a conditional command;
      in response to the command being determined as the synchronization command, enable a waiting queue of the one or more waiting queues for the command; and
      dispatch the command to a processing engine of the one or more processing engines.

16. The HAPU of clause 15, wherein the scheduler is configured to:
    determine whether there is a waiting queue available in the one or more waiting queues; and
    in response to there being a waiting queue available, enable the available waiting queue for the command.

17. The HAPU of clause 16, wherein the scheduler is configured to:
    in response to there being a waiting queue available, compare a virtual queue ID (VID) of the command with a running command status table, the running command status table comprising a VID for each dispatched command.

18. The HAPU of clause 17, wherein the scheduler is configured to:
in response to there being a waiting queue available,
determine whether there is another synchronization command in the running command status table having the same VID as the command; and
in response to there being another synchronization command in the running command status table having the same VID, clear the latest synchronization field for the another synchronization command in the running command status table.

19. The HAPU of any of clauses 15-18, wherein the scheduler is configured to:
update a synchronization command table to reflect that the enabled waiting queue is corresponding to the command.

20. The HAPU of any of clauses 15-19, wherein the scheduler is configured to:
in response to the command being determined as the synchronization command, update a running command status table.

21. The HAPU of any of clauses 15-20, wherein the scheduler is configured to:
set a latest synchronization field for the command in the running command status table.

22. The HAPU of any of clauses 15-21, wherein the scheduler is configured to:
in response to the command being determined as the conditional command, compare VID of the command with a running command status table, the running command status table comprising a VID for each dispatched command.

23. The HAPU of clause 22, wherein the scheduler is configured to:
in response to the command being determined as the conditional command,
determine whether there is a matched synchronization command in the running command status table having the same VID and having a latest synchronization field being set; and
in response to there being the matched synchronization command in the running command status table, push the conditional command to a waiting queue corresponding to the matched synchronization command.

24. The HAPU of clause 23, wherein the scheduler is configured to:
in response to there being no matched synchronization command in the running command status table,
determine whether a status field in a virtual queue command status table indicates an error; and
in response to the status field being determined not indicating an error, dispatch the command to a processing engine of the one or more processing engines.

25. The HAPU of clause 24, wherein the scheduler is configured to:
in response to the status field being determined indicating an error, dispatch the command as no-op operation.

26. The HAPU of clause 23, wherein the scheduler is configured to:
in response to there being no matched synchronization command in the running command status table, update a running command status table.

27. The HAPU of any of clauses 15-26, wherein the scheduler is configured to:
set a physical queue ID for the enabled waiting queue to a physical queue ID of the physical queue from which the command is picked.

28. The HAPU of any of clauses 15-27, wherein the scheduler is configured to:
in response to a synchronization command having a corresponding waiting queue is successfully performed,
pick a second command from the corresponding waiting queue;
update a running command status table; and
dispatch the second command to a processing engine of the one or more processing engines.

29. The HAPU of any of clauses 15-28, wherein the scheduler comprises:
a command decoder configured to decode commands;
a memory for storing data and tables;
a controller communicatively coupled with the command decoder and the memory and configured to schedule commands from the one or more physical queues and one or more waiting queues.

30. The HAPU of any of clauses 15-29, wherein the one or more processing engines are configured to:
update command status for a dispatched command.

31. A terminal, comprising:
a host unit; and
a heterogeneous acceleration processing unit (HAPU) communicatively coupled with the host unit, comprising:
one or more physical queues for storing commands;
one or more waiting queues for storing commands;
one or more processing engines configured to perform commands;
a scheduler communicatively coupled with the one or more physical queues, the one or more waiting queues and the one or more processing engines, the scheduler being configured to:
pick a command from a physical queue of the one or more physical queues;
determine whether the command is a synchronization command or a conditional command;
in response to the command being determined as the synchronization command, enable a waiting queue of the one or more waiting queues for the command; and
dispatch the command to a processing engine of the one or more processing engines.

32. A non-transitory computer readable storage medium storing a set of instructions that are executable by one or more processing devices to cause a heterogeneous computation units (HCUs) to perform a method comprising:
picking a command;
determining whether the command is a synchronization command or a conditional command;
in response to the command being determined as the synchronization command, enabling a waiting queue for the command; and
dispatching the command to a processing engine.

33. The non-transitory computer readable storage medium of clause 32, wherein enabling a waiting queue for the command comprises:
determining whether there is a waiting queue available; and
in response to there being a waiting queue available, enabling the waiting queue for the command.

34. The non-transitory computer readable storage medium of clause 33, wherein the method further comprises:
in response to there being a waiting queue available, comparing a virtual queue ID (VID) of the command with a running command status table, the running command status table comprising a VID for each dispatched command.

35. The non-transitory computer readable storage medium of clause 34, wherein the method further comprises:
in response to there being a waiting queue available, determining whether there is another synchronization command in the running command status table having the same VID as the command; and
in response to there being another synchronization command in the running command status table having the same VID, clearing the latest synchronization field for the another synchronization command in the running command status table.

36. The non-transitory computer readable storage medium of any of clauses 32-35, wherein enabling a waiting queue for the command comprises:
updating a synchronization command table to reflect that the enabled waiting queue is corresponding to the command.

37. The non-transitory computer readable storage medium of any of clauses 32-36, wherein the method further comprises:
in response to the command being determined as the synchronization command, updating a running command status table.

38. The non-transitory computer readable storage medium of any of clauses 32-37, wherein the method further comprises:
setting a latest synchronization field for the command in the running command status table.

39. The non-transitory computer readable storage medium of any of clauses 32-38, wherein the method further comprises:
in response to the command being determined as the conditional command, comparing a VID of the command with a running command status table, the running command status table comprising a VID for each dispatched command.

40. The non-transitory computer readable storage medium of clause 39, wherein the method further comprises:
in response to the command being determined as the conditional command,
determining whether there is a matched synchronization command in the running command status table having the same VID and having a latest synchronization field being set; and
in response to there being the matched synchronization command in the running command status table, pushing the conditional command to a waiting queue corresponding to the matched synchronization command.

41. The non-transitory computer readable storage medium of clause 39, wherein the method further comprises:
in response to the command being determined as the conditional command,
determining whether there is a matched synchronization command in the running command status table having the same VID and having a latest synchronization field being set; and
in response to there being no matched synchronization command in the running command status table,
determining whether a status field in a virtual queue command status table indicates an error; and
in response to the status field being determined not indicating an error, dispatching the command to a processing engine.

42. The non-transitory computer readable storage medium of clause 41, wherein the method further comprises:
in response to the status field being determined indicating an error, dispatching the command as no-op operation.

43. The non-transitory computer readable storage medium of clause 41, wherein the method further comprises:
in response to there being no matched synchronization command in the running command status table, updating a running command status table.

44. The non-transitory computer readable storage medium of any of clauses 32-43, wherein enabling the waiting queue for the command comprises:
setting a physical queue ID for the waiting queue to a physical queue ID of a physical queue from which the command is picked.

45. The non-transitory computer readable storage medium of any of clauses 32-44, wherein the method further comprises:
in response to a synchronization command having a corresponding waiting queue is successfully performed,
picking a second command from the corresponding waiting queue;
updating a running command status table; and
dispatching the second command to a processing engine.

The various example embodiments described herein are described in the general context of method steps or processes, which may be implemented in one aspect by a computer program product, embodied in a computer readable medium, including computer-executable instructions, such as program code, executed by computers in networked environments. A computer readable medium may include removeable and nonremovable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the present disclosure are apparent from the detailed specification, and thus, it is intended that the appended claims cover all systems and methods falling within the true spirit and scope of the present disclosure. As used herein, the indefinite articles "a" and "an" mean "one or more." Further, since numerous modifications and variations will readily occur from studying the present disclosure, it is not desired to limit the present disclosure to the exact construction and operation illustrated and described, and accordingly, all suitable modifications and equivalents may be resorted to, falling within the scope of the present disclosure.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A method of scheduling commands in a virtual computing environment, the method performed by a heterogeneous acceleration processing unit (HAPU) and comprising:
    picking a command received by the HAPU from a host unit separate from the HAPU;
    determining whether the command is a synchronization command or a conditional command, wherein a synchronization command is an independent command and a conditional command is a dependent command that depends on a synchronization command;
    in response to the command being determined as the synchronization command, enabling a waiting queue for the command, wherein the waiting queue is configured to store conditional commands dependent on a running synchronization command;
    in response to the command being determined as the conditional command, comparing a virtual queue ID (VID) of the command with a running command status table, the running command status table comprising a VID for each dispatched command; and
    dispatching the command to a processing engine.

2. The method of claim 1, wherein enabling the waiting queue for the command comprises:
    determining whether there is a waiting queue available; and
    in response to there being a waiting queue available, enabling the waiting queue for the command.

3. The method of claim 2, further comprising:
    in response to there being a waiting queue available, comparing a virtual queue ID (VID) of the command with a running command status table, the running command status table comprising a VID for each dispatched command.

4. The method of claim 3, further comprising:
    in response to there being a waiting queue available, determining whether there is another synchronization command in the running command status table having the same VID as the command; and
    in response to there being another synchronization command in the running command status table having the same VID, clearing a latest synchronization field for the another synchronization command in the running command status table.

5. The method of claim 1, further comprising:
    in response to the command being determined as the synchronization command, updating a running command status table.

6. The method of claim 1, further comprising:
    in response to the command being determined as the conditional command,
        determining whether there is a matched synchronization command in the running command status table having the same VID and having a latest synchronization field being set; and
        in response to there being the matched synchronization command in the running command status table, pushing the conditional command to a waiting queue corresponding to the matched synchronization command.

7. The method of claim 1, further comprising:
    in response to the command being determined as the conditional command,
        determining whether there is a matched synchronization command in the running command status table having the same VID and having a latest synchronization field being set; and
        in response to there being no matched synchronization command in the running command status table,
            determining whether a status field in a virtual queue command status table indicates an error; and
            in response to the status field being determined not indicating an error, dispatching the command to a processing engine.

8. The method of claim 7, further comprising:
    in response to there being no matched synchronization command in the running command status table, updating a running command status table.

9. The method of claim 1, further comprising:
    in response to a synchronization command having a corresponding waiting queue is successfully performed,
        picking a second command from the corresponding waiting queue;
        updating a running command status table; and
        dispatching the second command to a processing engine.

10. A heterogeneous acceleration processing unit (HAPU), comprising:
    one or more physical queues for storing commands, wherein the commands are received by the HAPU from a host unit separate from the HAPU;
    one or more waiting queues for storing commands;
    one or more processing engines configured to perform commands;
    a scheduler communicatively coupled with the one or more physical queues, the one or more waiting queues and the one or more processing engines, the scheduler being configured to:
        pick a command from a physical queue of the one or more physical queues;
        determine whether the command is a synchronization command or a conditional command, wherein a synchronization command is an independent command and a conditional command is a dependent command that depends on a synchronization command;

in response to the command being determined as the synchronization command, enable a waiting queue of the one or more waiting queues for the command, wherein the waiting queue is configured to store conditional commands dependent on a running synchronization command;

in response to the command being determined as the conditional command, comparing a virtual queue ID (VID) of the command with a running command status table, the running command status table comprising a VID for each dispatched command; and dispatch the command to a processing engine of the one or more processing engines.

11. The HAPU of claim 10, wherein the scheduler is configured to:

determine whether there is a waiting queue available in the one or more waiting queues; and in response to there being a waiting queue available, enable the available waiting queue for the command.

12. The HAPU of claim 11, wherein the scheduler is configured to:

in response to there being a waiting queue available, compare a virtual queue ID (VID) of the command with a running command status table, the running command status table comprising a VID for each dispatched command.

13. The HAPU of claim 12, wherein the scheduler is configured to:

in response to there being a waiting queue available, determine whether there is another synchronization command in the running command status table having the same VID as the command; and in response to there being another synchronization command in the running command status table having the same VID, clear a latest synchronization field for the another synchronization command in the running command status table.

14. The HAPU of claim 10, wherein the scheduler is configured to:

in response to the command being determined as the synchronization command, update a running command status table.

15. The HAPU of claim 10, wherein the scheduler is configured to:

in response to the command being determined as the conditional command, determine whether there is a matched synchronization command in the running command status table having the same VID and having a latest synchronization field being set; and in response to there being the matched synchronization command in the running command status table, push the conditional command to a waiting queue corresponding to the matched synchronization command.

16. The HAPU of claim 15, wherein the scheduler is configured to:

in response to there being no matched synchronization command in the running command status table, determine whether a status field in a virtual queue command status table indicates an error; and in response to the status field being determined not indicating an error, dispatch the command to a processing engine of the one or more processing engines.

17. The HAPU of claim 15, wherein the scheduler is configured to:

in response to there being no matched synchronization command in the running command status table, update a running command status table.

18. The HAPU of claim 10, wherein the scheduler is configured to:

in response to a synchronization command having a corresponding waiting queue is successfully performed, pick a second command from the corresponding waiting queue;

update a running command status table; and dispatch the second command to a processing engine of the one or more processing engines.

19. The HAPU of claim 10, wherein the scheduler comprises:

a command decoder configured to decode commands;

a memory for storing data and tables;

a controller communicatively coupled with the command decoder and the memory and configured to schedule commands from the one or more physical queues and one or more waiting queues.

20. A terminal, comprising:

a host unit; and a heterogeneous acceleration processing unit (HAPU) communicatively coupled with the host unit, comprising:

one or more physical queues for storing commands, wherein the commands are received by the HAPU from the host unit;

one or more waiting queues for storing commands;

one or more processing engines configured to perform commands;

a scheduler communicatively coupled with the one or more physical queues, the one or more waiting queues and the one or more processing engines, the scheduler being configured to:

pick a command from a physical queue of the one or more physical queues;

determine whether the command is a synchronization command or a conditional command, wherein a synchronization command is an independent command and a conditional command is a dependent command that depends on a synchronization command;

in response to the command being determined as the synchronization command, enable a waiting queue of the one or more waiting queues for the command, wherein the waiting queue is configured to store conditional commands dependent on a running synchronization command;

in response to the command being determined as the conditional command, comparing a virtual queue ID (VID) of the command with a running command status table, the running command status table comprising a VID for each dispatched command; and dispatch the command to a processing engine of the one or more processing engines.

21. A non-transitory computer readable storage medium storing a set of instructions that are executable by one or more processing devices to cause a heterogeneous computation unit (HCU) to perform a method comprising:

picking a command received by the HCU from a host unit separate from the HCU;

determining whether the command is a synchronization command or a conditional command, wherein a synchronization command is an independent command and a conditional command is a dependent command that depends on a synchronization command;

in response to the command being determined as the synchronization command, enabling a waiting queue for the command, wherein the waiting queue is configured to store conditional commands dependent on a running synchronization command;

in response to the command being determined as the conditional command, comparing a virtual queue ID (VID) of the command with a running command status table, the running command status table comprising a VID for each dispatched command; and dispatching the command to a processing engine.

* * * * *